United States Patent [19]
Anderson et al.

[11] Patent Number: 5,360,654
[45] Date of Patent: Nov. 1, 1994

[54] SORBENT ARTICLES

[75] Inventors: Philip A. Anderson, Maplewood, Minn.; Ronald R. Gorke, Houlton, Wis.; Thomas I. Insley, Lake Elmo, Minn.; Daniel E. Meyer, Stillwater, Minn.; David A. Olson, St. Paul, Minn.

[73] Assignee: Minnesota Mining and Manufacturing Company, St. Paul, Minn.

[21] Appl. No.: 10,565

[22] Filed: Jan. 28, 1993

[51] Int. Cl.$^5$ .................. B01D 15/00; B32B 1/00; C02F 1/28; E02B 15/06
[52] U.S. Cl. ............................ 428/98; 55/528; 156/62.4; 210/671; 210/680; 210/691; 210/242.4; 210/502.1; 210/505; 210/924; 405/63; 428/113; 428/219; 428/220; 428/311.1; 428/311.5; 428/369
[58] Field of Search ................. 55/528; 156/62.4; 210/671, 680, 691, 242.4, 502.1, 505, 924; 405/63; 428/98, 113, 219, 220, 311.1, 311.5, 369

[56] References Cited

U.S. PATENT DOCUMENTS

| | | |
|---|---|---|
| 3,073,735 | 1/1963 | Till . |
| 3,739,913 | 6/1973 | Bogosian . |
| 3,933,557 | 1/1976 | Pall . |
| 3,971,373 | 7/1976 | Braun . |
| 3,981,100 | 9/1976 | Weaver et al. . |
| 4,001,067 | 1/1977 | Johnson . |
| 4,100,324 | 7/1978 | Anderson et al. . |
| 4,118,531 | 10/1978 | Hauser . |
| 4,357,379 | 11/1982 | Sloan et al. . |
| 4,366,067 | 12/1982 | Golding et al. . |
| 4,429,001 | 1/1984 | Kolpin et al. . |
| 4,497,712 | 2/1985 | Cowling . |
| 4,594,202 | 6/1986 | Pall et al. . |
| 4,604,313 | 8/1986 | McFarland et al. . |
| 4,659,478 | 4/1987 | Stapelfeld et al. . |
| 4,737,394 | 4/1988 | Zafiroglu . |
| 4,792,399 | 12/1988 | Haney et al. . |
| 4,813,948 | 3/1989 | Insley . |
| 4,902,544 | 2/1990 | Kim et al. . |
| 4,933,299 | 6/1990 | Insley et al. . |
| 4,965,129 | 10/1990 | Bair et al. . |
| 4,973,503 | 11/1990 | Hotchkiss . |
| 4,988,560 | 1/1991 | Meyer et al. . |
| 5,165,821 | 11/1992 | Fischer et al. . |

OTHER PUBLICATIONS

3M Product Bulletin, "Maintenance Sorbents," N. 70-0704-0625-4 (227.5) DPI.

Wente, Van A., "Superfine Thermoplastic Fibers," *Industrial Engineering Chemistry*, vol. 48, p. 1342 et seq. (1956).

Wente, Van A.; Boone, C. D.; and Fluharty, E. L., Report No: 4364 of the Naval Research Laboratories, May 25, 1954, "Manufacture of Superfine Organic Fibers".

*Primary Examiner*—James C. Cannon
*Attorney, Agent, or Firm*—Gary L. Griswold; Walter N. Kirn; Carole Truesdale

[57] ABSTRACT

A microfibrous sorbent article is provided. The microfibrous sorbent article comprises an elongate boom having a substantially oval cross-section. The boom is formed of multiple adjacent microfibers layers, the layers being bonded to each other by entanglement of fibers between adjacent layers. Also provided is a method for making the microfibrous sorbent article.

35 Claims, 2 Drawing Sheets

SORBENT ARTICLES

FIELD OF THE INVENTION

The invention relates to sorbent articles formed from microfibers and, optionally, staple fibers and particulate material. The articles are in the form of elongate bodies such as, for example, booms.

DESCRIPTION OF RELATED ART

A variety of materials, delivered in numerous configurations have been used for sorption of liquids. These materials include boom and pillow configurations consisting of a casing filled with particulate sorbent products such as clay, cellulose, chopped corn cobs, or chopped microfibrous materials as well as sheet materials formed from wood pulp fibers or blown microfibers. A casing can also be filled with sorbent sheet or roll good materials.

U.S. Pat. No. 4,497,712 (Cowling) describes an expendable pillow in the form of a container of highly permeable, surfactant coated fabric having at least one pocket partially filled with a granular absorbent material such as ground corn cobs. The pillow is described as being light weight, having an absorption capacity in excess of 500% and capable of floating on liquids.

U.S. Pat. No. 4,366,067 (Golding et al.) discloses bags or booms of porous material filled with an oil absorbent, particulate polyisocyanurate synthetic foam material which is used to enclose and absorb oil spilled on water or hard surfaces.

U.S. Pat. No. 4,659,478 (Stapelfeld, et al.) describes an oil absorbing member and method which includes an elongate tubular member filled with a highly absorbent particulate material of capillary nature having a wicking action such as ground corn cobs. The tubular member is closed at each end and can be arranged around a tool base as a continuous absorbing member.

U.S. Pat. No. 4,792,399 (Haney et al.) describes a liquid collecting and retaining device consisting of a tubular, triangular shaped casing of a material which is permeable to liquids, which is partially filled with a material that collects and retains liquids passing through the casing, and which is incapable of itself passing through the casing.

U.S. Pat. No. 4,965,129 (Bair et al.) discloses a sausage-shaped liquid-absorbing article which includes within a porous fabric, fine, fibrous particles of flashspun polyethylene, optionally particles of foamed organic polymer, and an effective amount of wetting agent. The article is capable of absorbing oils or aqueous liquids in amounts equal to at least six times the weight of the particles.

U.S. Pat. No. 4,902,544 (Kim et al.) describes a leak resistant absorbent article made from a tubular casing of liquid permeable fabric wherein the casing is loosely filled with a mixture of particles of a crosslinked hydrocolloid and particles of other liquid absorbing material such as saw dust, crushed corn cobs, cotton linters, wood pulp and the like.

U.S. Pat. No. 4,737,394 (Zafiroglu) discloses an oil-absorbing article comprised of an outer fabric which encloses fibrous oil absorbing particles such as flashspun linear polyethylene. The porous fabric is a nonwoven fibrous polyolefin layer of polyethylene or polypropylene that is stitch-bonded with an elastic thread.

U.S. Pat. No. 3,739,913 (Bogosian) describes an elongate body of oil absorbing material and flotation material including longitudinal reinforcing means whereby a plurality of bodies can be disposed in end-to-end relationship for temporarily fencing oil spills on water for retention and absorption of the oil. The body contents comprise oil absorbing fibers which are natural or synthetic or combination thereof and may include a flotation material interspersed therewith to aid buoyancy of the body even after saturation of the fibers by oil. In addition to the above referenced patents, there are a number of commercially available spill containment and recovery articles. For example, 3M Company, St. Paul, Minn., sells a family of liquid sorbent articles designed to contain and recover liquid spills. These articles, which are based on sorbent microfibrous materials, include sheet goods for wiping and final cleanup operations, pillows of chopped microfibrous materials contained within a covering designed for intermediate quantity liquid recovery, and booms of chopped microfibrous materials contained within an elongate casing having a substantially circular cross-section, which are used to recover larger spills. These materials are described, for example, in 3M product bulletin "Maintenance Sorbents"N. 70-0704-0625-4(227.5) DPI.

None of these spill containment and absorbent recovery systems is completely universally satisfactory because of certain problems. Those products containing particulate sorbent materials such as clay, cellulose, foams, vermiculite or chopped corn cobs frequently have escape of dust particulates rendering cleanup inconvenient and messy. Also shifting or pocketing of particulate material within the casing often causes concentrating of the sorbent in some areas while creating voids of sorbents in other areas. When sorbent recovery systems of the type having sorbent particulate contained within a casing are compressed to extract sorbed fluids, the particulate material within the casing can shift and pocket creating voids of sorbent in portions of the casing. This renders the sorbent article less useful for performing spill containment and recovery upon redeployment.

U.S. Pat. No. 4,357,379 (Sloan, et al.) discloses a modification of the meltblowing process to form a rod having a relatively dense, rigid skin in which the fiber portions are oriented primarily in a longitudinal direction with respect to the axis of the product, and a less dense core where the fiber portions are oriented primarily in the transverse direction with respect to the axis of the product. The products are made by melt blowing fibers and intercepting them by a fiber collecting and forming device which permits a relatively heavy build-up of fibers in a lip portion surrounding the central portion. The collecting device may be funnel shaped, trumpet shaped or in the form of continuous belts which are shaped such that in combination the form a cylindrical opening at their nip. The fibers in the lip portion being deposited while still in a thermoplastic state, thermally bond together. As fibers are continuously deposited on the collecting and forming device, the product thus formed is withdrawn at a rate synchronized with of fibers such that the aforesaid build-up is maintained, and such that the lip portion is folded back over the central portion by the collecting and forming device to form the rod as described. The fibrous product has sufficient rigidity and resiliency for use in filters, ink pen reservoirs, etc.

U.S. Pat. No. 3,933,557 (Pall) discloses a process for the continuous production of nonwoven webs in cylindrical or sheet form from thermoplastic fibers, spinning the fibers continuously from a melt onto a rotating mandrel and winding them up on the mandrel to form a generally spirally wound cylinder.

U.S. Pat. No. 4,594,202 (Pall et al.) describes a method of manufacturing cylindrical fibrous structures comprising the steps of: extruding synthetic, polymeric material from a fiberizing die and attenuating the extruded polymeric material to form microfibers by the application of one or more gas streams directed toward a rotating mandrel and a forming roll in operative relationship with the mandrel; cooling the synthetic, polymeric microfibers prior to their collection on the mandrel to a temperature below that at which they bond or fuse together, thereby substantially eliminating fiber-to-fiber bonding; and collecting the cooled microfibers on the mandrel as a nonwoven, synthetic fibrous mass while applying a force on the exterior surface of the collected microfibers by the forming roll; wherein the process variables are controlled to form a cylindrical fiber structure with at least the major portion of the fibrous mass having substantially constant void volume.

U.S. Pat. No. 4,973,503 (Hotchkiss) discloses microfiber tow or tube products wherein larger diameter, short fibers are mixed with microfibers. The mixture is formed by physically entangling microfibers (having an average diameter in the range of up to about 10 microns and being discontinuous) containing 10% to 90% of shorter fibers with the microfibers being predominately aligned parallel to the axis of the tow and the mixture being bonded at contact points between microfibers and the shorter fibers. The method of making the mixed fiber tow or tube products includes the steps of forming a melt with thermoplastic material and extruding it through one or more series of orifices arranged in a rounded or spinneret configuration at the die tip. The extruded melt is contacted with a first stream of gas whereby it is formed into a network of physically entangled microfibers that are attenuated to microfiber size. A second gas stream is used having entrained larger diameter, short fibers, and the gas streams are merged to form a mixture of fibers. The mixture is collected as a tow or tube having the desired fiber orientation. Uses for such tows or tubes are described as including beauty coils, tampons, cigarette filters, bottle stuffers, and with additives, other products such as insulating caulk and the like.

U.S. Pat. No. 3,073,735 (Till et al.) discloses a method for producing filters wherein fibers from a plurality of fiber-forming means are suspended in a gas stream and deposited on a collecting surface. The fibers of each fiber-forming means differ in physical characteristics from those of the other means, e.g., one of the fibers may be preformed, such as staple textile fibers and the other fiber may be produced in situ by feeding a plastic fiber-forming composition from a reservoir to a spraying unit which comprises a spraying tube positioned in the center of a nozzle through which air is forced at a high velocity. The fibers are deposited on the collecting device in such intermingled relationship that there is a gradual gradation in fiber property along one dimension of the filter.

U.S. Pat. No. 4,604,313 (McFarland et al.) discloses selective layering of super absorbents in meltblown substrates. A meltblown material containing wood fiber is formed on a continuous formanious belt. The belt carrying this layer then passes beneath at least one further source of meltblown fiber into which super absorbent is added along with wood fibers.

SUMMARY OF THE INVENTION

The present invention provides a microfibrous sorbent article comprising an elongate boom having a substantially oval cross-section, said boom being formed of multiple adjacent microfibers layers, said layers being bonded to each other by entanglement of fibers between adjacent layers.

The term "substantially oval cross-section" as used herein means the boom has a cross-section with a transverse aspect ratio at least 1.2 times that of the vertical aspect with at least one transverse surface being curved.

The present invention further provides a method of making a microfibrous sorbent article comprising
 a) extruding molten thermoplastic fiber-forming polymer from multiple orifices in a fiber-forming die, said orifices being aligned along the face of the die;
 b) attenuating the fibers in a stream of hot air;
 c) collecting said fibers on a collector surface substantially parallel to said die face and moving transverse to said die face.

The term "substantially parallel" as used herein to describe the relation between the collector surface and the die means that one end of the collector surface is angled no more than about 60° from the die than the other end.

The articles, or booms, of the present invention are capable of rapid sorption of liquid and high liquid retention. The booms do not experience shifting, pocketing or compacting of sorbent material during storage, use or after reclamation of sorbed liquid. Incineration of used booms generally results in low ash generation. The booms are integral and handleable both before and after immersion in liquid because the collected fibers are extensively entangled within each layer as well as entangled between layers. The booms are flexible and conformable and can be shaped to fit a specific area, e.g., around the base of equipment. The articles of the invention may further contain sorbent particulate materials and bulking staple fiber.

DETAILED DESCRIPTION OF THE INVENTION

Figure 1:
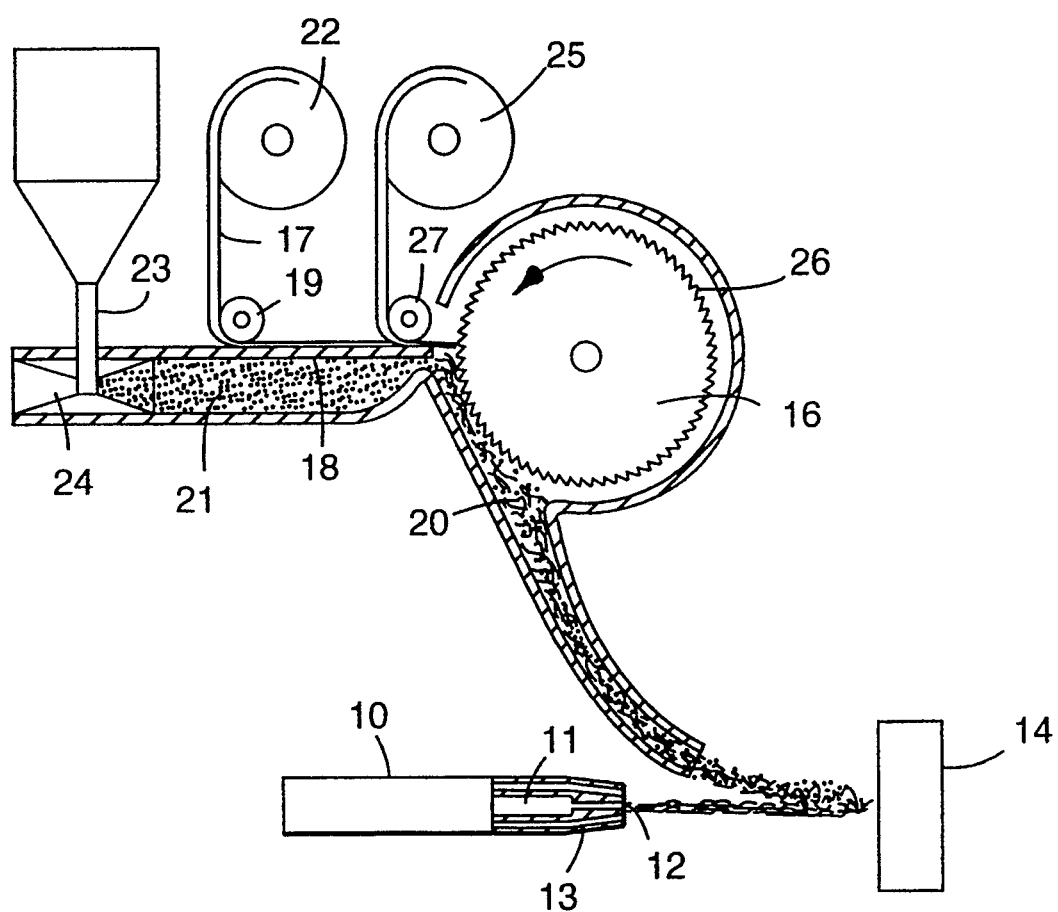
FIG. 1 is a side view of an apparatus useful in practicing the present invention.
Figure 2:
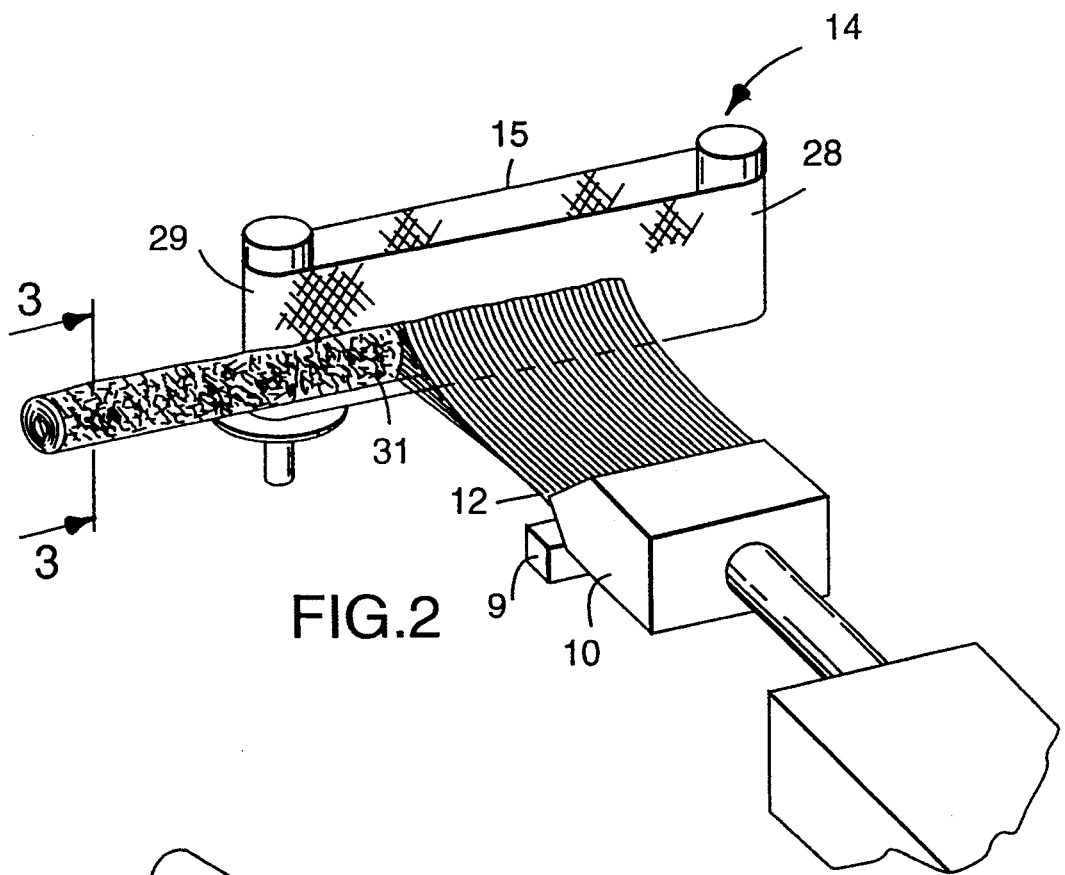
FIG. 2 is a perspective view of a portion of the apparatus useful in practicing the present invention.

A representative apparatus useful for preparing the boom of the present invention is shown schematically in FIGS. 1 and 2. Except for the collector, the apparatus is generally similar to that taught in U.S. Pat. No. 4,118,531 for preparing a web of melt-blown fibers and crimped bulking fibers which is incorporated herein for reference.

The fiber-blowing portion of the illustrated apparatus can be a conventional structure as taught, for example, in Wente, Van A. "Superfine Thermoplastic Fibers", in Industrial Engineering Chemistry, Vol. 48, pages 1342 et seq (1956), or in Report No. 4364 of the naval Research Laboratories, published May 25, 1954, entitled "Manufacture of Superfine organic Fibers: by Wente, Van A.; Boone, C. D.; and Fluharty, E. L. Such a structure includes a die 10 which has an extrusion chamber 11 through which liquefied fiber-forming material is advanced; die orifices 12 arranged in lines across the forward end of the die and through which the fiber-forming material is extruded; and cooperating gas orifices 13 through which a gas, typically heated air, is forced at very high velocity. The high-velocity gaseous stream draws out and attenuates the extruded fiberforming material, whereupon the fiber-forming material solidifies as fibers during travel to a collector 14. Collector 14 uses a closed-loop belt 15, typically a finely perforated screen, but the belt can be of fabric, wire, film, rubber or combinations thereof. The plane of the collector surface is substantially parallel to the die face and moves transverse to the die face with the input side of the collector 28 being that which the microfibers initially contact and the output side 29 being that where the boom 31 is formed. Preferably, the distance between the die and the collector is about 0.2 to 0.7m, more preferably about 0.3 to 0.5m. The collector generally tracks at a rate of 2 to 40m/min. Gas-withdrawal apparatus may be positioned behind the screen to assist in deposition of fibers-and removal of gas. Surfactant and/or quenching water spray may be applied to the web by optional spray bar 9. Alternatively, two dies may be used and arranged so that the streams of melt blown fibers issuing from them intersect to form one stream that continues to a collector 14. Preferably, the die has at least about 10 orifices, more preferably at least about 100 orifices, most preferably at least about 500 orifices. Generally, the die has no more than about 2000 orifices.

Figure 3:
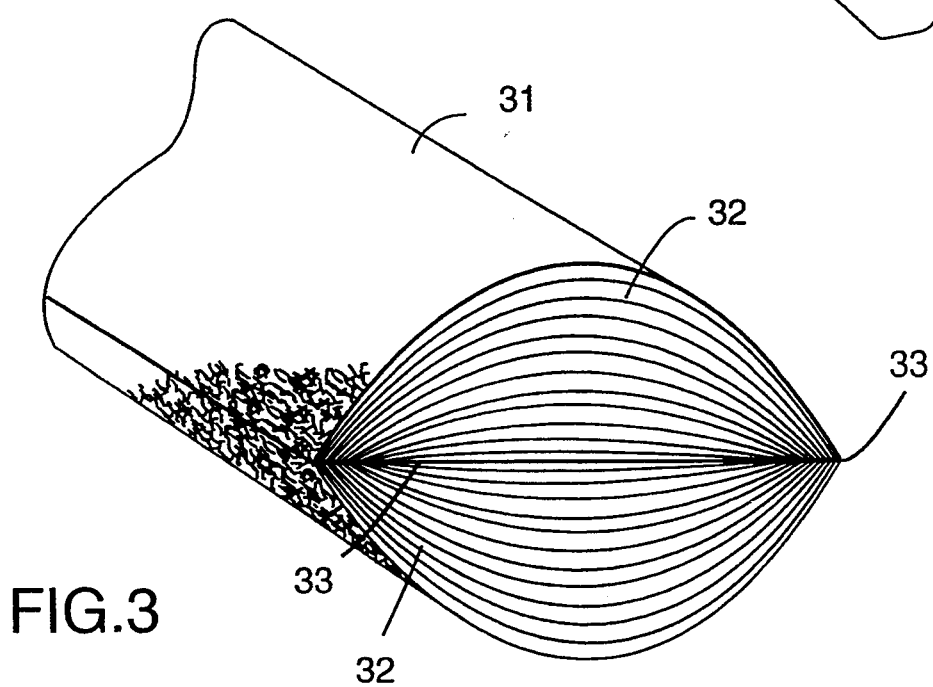
FIG. 3 is a perspective view of a microfibrous sorbent article of the present invention.

As can be seen in FIG. 3, the boom 31 of the present invention is layered. When viewed in cross-section, the boom, formed from multiple layers 32, has a contribution of fiber from each die orifice. Such a structure provides a boom with the microfibers substantially uniformly distributed over the length of the boom. The booms of the invention generally have a diameter, i.e., the average of the transverse and vertical aspects, of about 50 mm to about 30 cm and are substantially continuous as formed but can be cut to desired lengths. The cross-sectional shape of the boom can be adjusted to some extent by trimming the sides 33 of the boom using any known trimming technique, e.g., score roll, hot wire, or water jet. Such trimming is also useful for aesthetic purposes. The amount trimmed can range up to about 20 weight percent, but is generally in the range of about 5 to 10 weight percent. The linear weight of the booms of the invention can range from about 25 to 600 g/m.

Microfibers useful in the invention may be formed from nearly any fiber-forming material. Melt blown microfibers are greatly preferred for booms of the invention, but solution blown microfibers in which the fiber forming material is made liquid by inclusion of a volatile solvent can also be used. U.S. Pat. No. 4,001,067 (Carey) describes useful apparatus and procedures for preparing a web of such fibers; however, in preparing booms of this invention fiber-forming material is generally extruded through a plurality of adjacent orifices rather than the single orifice shown in the patent. Representative polymers for forming melt-blown microfibers include polyolefins such as polypropylene and polyethylene, polyesters such as polyethylene terephthalate and polybutylene terephthalate, polyamides, polyurethane, polystyrene-polybutadiene-polystyrene block copolymers, and other polymers as known in the art. Useful polymers for forming microfibers from solution include polyvinyl chloride, acrylics, and acrylic copolymers, polystyrene, and polysulfone.

The effective average diameter of the carrier microfibers of the blown microfiber web is generally less than about 10 microns and more preferably about 5 to 10 microns. The effective fiber diameter is calculated according to the method set forth in Davies, C. N., "The Separation of Airborne Dust and Particles," Institution of Mechanical Engineers, London, Proceedings 1B, 1952. To form useful booms, the aspect ratio (ratio of length to diameter) of the microfibers should approach infinity, though blown microfibers are known to be discontinuous.

In preferred embodiments of the invention, the boom also contains crimped bulking fibers and/or sorbent or neutralizing particulate material. The sorbent particulate material can be in the form of microfiber microwebs or substantially solid particles such as, for example, wood pulp fibers, modified starches, diatomaceous earth, high-molecular weight acrylic polymers containing hydrophilic groups, alkylstyrene particles and activated carbon. Neutralizing sorbent particulate material can include sodium bicarbonate, calcium hydroxide, borax, potassium dihydrogen phosphate, disodium hydrogen phosphate and potassium hydrogen phthalate. The boom may also contain other materials such as mold retardant, e.g., calcium propionate, and other preservatives, bacteriostatic agents, e.g., ureaformaldehyde resins and n-butyl-2-cyanoacrylate.

When crimped bulking fibers are incorporated, they are introduced into the stream of blown microfibers in the illustrative apparatus shown in FIG. 1 through the use of a lickerin roll 16 disposed above the microfiber-blowing apparatus. A web 17 of bulking fibers, typically a loose, nonwoven web provided as roll 22 such as prepared on a garnet machine or RANDO-WEBER, is propelled along a table 18 under a drive roll 27 where the leading edge engages against the lickerin roll 16. The lickerin roll turns in the direction of the arrow and picks off fibers from the leading edge of the web 17, separating the fibers from one another. The separated fibers are conveyed in an air stream through an inclined trough or duct 20 and into the stream of blown microfibers where they become mixed with the blown microfibers. The air stream is generated inherently by rotation of the lickerin roll, or that air stream may be augmented by use of an auxiliary fan or blower operating through a duct 21 as known in the art.

The crimped bulking fibers have a continuous wavy, curly or jagged character along their length. The number of crimps, i.e., complete waves or cycles, per unit length can vary rather widely but generally is in the range of about 1 to 10 crimps/cm, preferably at least 2 crimps/cm. The size of the crimped bulking fiber can also vary widely but generally is in the range of about 1 to 100 decitex, preferably about 3 to 40 decitex. The crimped bulking fibers should have, as a minimum, an average length sufficient to include at least one complete crimp and preferably at least three or four crimps. Generally, the crimped bulking fibers average about 2 to 15 centimeters in length, preferably about 2 to 10 centimeters in length.

The amount of crimped bulking fibers included in the boom of the present invention can range from 0 to 90 weight percent but preferably is in the range of about 5 to 50 weight percent. The addition of the crimped bulking fibers reduces the density or solidity of the boom and generally permits greater sorption capacity of liquids.

When the boom of the invention is to be used for sorption of aqueous liquid, particulate materials such as wood pulp fiber or sorbent particulate can be used. The preferred sorbent materials are generally substantially solid super sorbent particles which rapidly sorb large quantities of liquids and retain the liquid under pressure. Examples of such substantially solid supersorbent particles .include, for example, water-insoluble modified starches, such as those described in U.S. Pat. No. 3,981,100 and high molecular weight acrylic polymers containing hydrophilic groups. A wide variety of commercially available water-insoluble, water-sorbing particles typically sorb 20 or more times their weight of water and preferably 100 or more times their weight of water. With such modified starches and acrylic polymers the amount of water sorbed generally decreases as impurities in the water, such as salts and ionic species, increase. Among sorbent particles useful for sorbing liquids other than water are alkylstyrene sorbent particles such as IMBIBER BEADS available from Dow Chemical Company which generally sorb about 5 to 10 times or more their weight of liquid.

The amount of sorbent particulate included in the boom of the present invention can range from 0 to 90 weight percent but preferably is in the range of about 10 to 50 weight percent. The sorbent particulate material may be introduced into the microfiber stream from hopper 23 through metering device 24 and ducts 21 and 20.

Microfiber microwebs may also be used as sorbent particles in the booms of the present invention. The microfiber microwebs have a relatively dense nucleus with numerous individual fibers and/or fiber bundles extending therefrom. The extended fibers and fiber bundles provide an anchoring means for the microfiber microwebs when they are incorporated into the boom. The nucleus of the microfiber microwebs is preferably in the range of about 0.05 to 4 mm, more preferably in the range of about 0.2 to 2 mm. The extending fibers and/or fiber bundles preferably extend beyond the nucleus to provide an overall diameter of about 0.07 to 10 mm, more preferably about 0.1 to 5 mm. Such microfiber microwebs are described in U.S. Pat. No. 4,813,948 (Insley) which is incorporated herein by reference.

The microfiber microwebs useful in the present invention can be prepared from source microfiber webs such as, for example, those disclosed in Wente, Van A., "Superfine Thermoplastic Fibers," Industrial Engineering Chemistry, vol. 48, pp. 1342–1346 and in Wente, Van A. et al., "Manufacture of Superfine Organic Fibers," Report No. 4364 of the Naval Research Laboratories, published May 25, 1954, or from microfiber webs containing particulate matter such as those disclosed, for example, in U.S. Pat. No. 3,971,373 (Braun), U.S. Pat. No. 4,100,324 (Anderson et al.), and U.S. Pat. No. 4,429,001 (Kolpin et al.), which references are incorporated herein as exemplifying preparation of source microfiber webs.

The microfiber microwebs are prepared by mechanically divellicating, or tearing apart, the source microfiber web. Divellication can be accomplished, for example, by subjecting the source microfiber web to a lickerin as shown in FIG. 1. Source microfiber web 25 is fed to lickerin 16 which has, protruding from the surface thereof, teeth 26. The teeth must be at a sufficiently low angle, e.g., preferably less than about 60°, more preferably less than about 40°, from the surface of the lickerin to produce the microwebs having a relatively dense nucleus with fibers and fiber bundles extending therefrom. The lickerin rotates, counter clockwise as depicted in FIG. 1, at a rate sufficient to divellicate source microfiber web 25 to form discrete microfiber microwebs. The source web is generally held in contact with the lickerin by means of a nose bar or delivery roll 27. An air stream provided through duct 21 serves to remove microfiber microwebs from the lickerin teeth. The microfiber microwebs can be collected for later incorporation into the nonwoven webs of the invention or the microfiber microwebs can be supplied directly from the lickerin into the base microfiber stream formed at die 10.

In addition to or in place of adding substantially solid sorbent particulate directly into the microfiber boom, microfiber source webs can be loaded with solid sorbent-type particulate materials and can be divellicated to provide microfiber microwebs which include useful amounts of solid particulate material. In the microfiber source web from which the microfiber microwebs are divellicated, sorbent particles can comprise at least about 5 g/m$^2$ for each 100 g/m$^2$ of microfiber, preferably as much as 150 g/m$^2$ for each 100 g/m$^2$ microfiber, and in some applications as much as 500 g/m$^2$ for each 100 g/m$^2$ microfiber.

The amount of microfiber microwebs included in the boom of the present invention can range from 0 to 90 weight percent but preferably is in the range of about 10 to 50 weight percent.

When crimped bulking fibers and/or sorbent particulate materials are fed into the base microfiber stream, the materials are mixed by the air turbulence present and then continue to the collector 14 where the fibers form a continuous boom. Under close examination, the microfibers and crimped bulking fibers and/or sorbent particulate material are found to be thoroughly mixed. For example, the web is free of clumps of crimped fibers, i.e., collections a centimeter or more in diameter of many crimped fibers, such as would be obtained if a chopped section or multi-ended tow of crimped filament were unseparated or if crimped fibers were balled together prior to introduction into a microfiber stream.

The optional crimped bulking fibers and/or the sorbent particulate material can be selectively loaded into the boom of the present invention. If the crimped bulking fibers and/or the sorbent particulate material are to be loaded throughout the boom, the crimped bulking fibers and/or the sorbent particulate material are fed into the microfiber stream across the full width of the die. If the crimped bulking fibers and/or the sorbent particulate material are to be located predominantly in the interior portion of the boom, the crimped bulking fibers and/or the sorbent particulate material is fed into the microfiber stream in the central portion of the die. Preferably, the crimped bulking fibers and/or the sorbent particulate material are fed into about 20 to 90 percent, more preferably 50 to 75 percent, of the die width when loaded into the interior portion of the boom. In this type of structure where the crimped bulking fibers and/or the sorbent particulate material are selectively loaded into the interior portion of the boom, the outer portions of the boom, formed from only the blown microfibers, substantially eliminate any dusting out of sorbent particulate material. Similarly, by adding the crimped bulking fibers and/or the sorbent particulate material predominantly at one side of the die, booms can be constructed such that one side contains the crimped bulking fibers and/or the sorbent particulate material and the other side is substantially formed from the blown microfibers.

When the boom is to be used for vapor suppression, i.e., sorption of vapors or contaminants from the air, the particulate material is an adsorbent material of the type commonly used to remove the particular vapor or contaminant that could be released from the sorbed liquid. Typical particles for use in vapor suppression or purifying booms include, for example, activated carbon, alumina, sodium bicarbonate and silver particles which remove a component from a fluid by adsorption, chemical reaction or amalgamation or such particulate catalytic agents as hopcalite which catalyze the conversion of a hazardous component, as well as clay and clay treated with acidic solutions such as acetic acid or alkaline solutions such as aqueous sodium hydroxide. The adsorbent particles may vary in size from about 5 to 3000 micrometers in average diameter. Preferably the particles are less than about 1500 micrometers in average diameter.

The amount of adsorbent particulate included in the boom can range from 0 to 90 weight percent but preferably is in the range of about 10 to 50 weight percent. The adsorbent particulate material may be introduced into the microfiber stream from hopper 23 through metering device 24 and ducts 21 and 20.

The following examples further illustrate this invention, but the particular materials and amounts thereof in these examples, as well as the conditions and details, should not be construed to unduly limit this invention. In the examples all parts and percentages are by weight unless otherwise specified. All booms were prepared using equipment similar to that depicted in FIGS. 1 and 2 unless otherwise indicated.

Oil Sorbency Test

Modified ASTM Test Method F726 9.1.3 was used to determine oil sorbency. A 12 inch (30.5 cm) long boom sample is weighed and placed in a 61 cm×91 cm tray containing a drain screen in the bottom. Light mineral oil having a viscosity of 50–60 SUS at 38° C. is added to the tray to a depth of at least 50 mm. The sample is allowed to submerge and the time to full saturation, by visual observation, is recorded. The sample is then left undisturbed for an additional period of time equal to at least 20% of the elapsed time to saturation. After the additional time, the sample is removed from the tray using the drain screen and is allowed to drain for 30 seconds. The boom sample is again weighed and the amount of oil remaining in the sample is determined. The oil sorption is the amount of oil remaining in the sample per dry sample weight (g/g). Preferably the oil sorbency is at least about 5 g/g, more preferably 10 g/g.

Tensile Strength

A boom sample is placed in an INSTRON tensile tester Model 1123, available from Instron Corporation, having jaw spacing of 25.4 cm and jaw faces 7.62 cm wide. The sample is tested at a crosshead speed of 20 cm/min. The peak tensile is recorded in N/boom.

Fabric Stiffness

Fabric stiffness was determined using ASTM Test Method D1388-64 and is reported as bend length.

Fluid Recovery

Fluid recovery was determined generally using ASTM Test Method F726 10.3. A boom sample is weighed (WDRY), saturated, drained and reweighed (WSAT) as in the Oil Sorbency Test and the amount of oil sorbed is calculated. The sample is then placed in a roller type wringer (Model 76-3 from Lake City Industries, Inc.) and the mineral oil is extracted from the sample using 1.4 kg/cm$^2$ pressure supplied to the roller surface by a pressure regulated cylinder adapted to the wringer. The extracted sample is then weighed (WEXT). The percent recovery is then calculated using the equation:

1-[(WEXT-WDRY)/(WSAT-WDRY)].

Vapor Sorption - Carbon Tetrachloride

A boom sample, preconditioned at 100° C. for 4 hours, was weighed and placed in a sealed desiccator on a porous ceramic plate positioned about 2 cm above 1 L carbon tetrachloride. After 24 hours, the boom was removed from the desiccator and weighed. The boom was reweighed at selected time intervals. Add-on weights were calculated in grams of carbon tetrachloride per gram of boom.

Acid Neutralization

A boom sample was weighed and saturated with excess hydrochloric acid. Titration was then performed with potassium hydroxide solution to determine the excess acid. The result is reported in MEQ base/g sample.

Boom Size

The size of the booms were measured with the width being measured parallel to the collection surface and the height being measured perpendicular to the collection surface at the midpoint of the boom.

EXAMPLES 1-8

In Examples 1-3, booms were prepared using polypropylene (FINA 7OMF, available from Fina Oil and Chemical Co.) melt blown microfibers having an average effective diameter of 8 microns. In Examples 4-6, booms were prepared containing 88.5 weight percent polypropylene (FINA 7OMF) melt blown microfibers having an average effective diameter of 8 microns and 11.5 weight percent microfiber microwebs. In Example 7, the boom was prepared as in Examples 4-6 except that the boom contained 18 weight percent polypropylene melt blown microfibers and 82 weight percent microfiber microwebs. In Example 8, the boom was prepared as in Examples 4-6 except the boom contained 21 weight percent polypropylene melt blown microfibers, 55 weight percent micro fiber microwebs, and 24 weight percent 15 denier polyester staple fiber (Type 431, 15 denier, 3 crimps/cm, available from Eastman Chemical Products, Inc.).

Each boom was prepared on equipment similar to that shown in FIG. 1. The extrusion rate, per unit length of die, was 0.42 kg/hr/cm; the collector was 0.33 m from the die in Examples 1–6 and, in Examples 7-8, the input side of the collector was 0.33 m from the die and the output side of the collector was 0.41 m from the die. The microfiber microwebs were prepared from a source web which weighed 410 g/m$^2$, had a solidity of 6% and was prepared from polypropylene (FINA 7OMF) melt blown microfiber having an average diameter of about 8 microns. The lickerin was operated at a speed of 2650 rpm and had 6.2 teeth/cm$^2$.

The meltblown microfiber was treated with 10.3 weight percent nonionic surfactant, (TRITON X-100, available from Union Carbide Corp.) and 0.5 weight percent gray pigment (#1607-052-15M Gray, available from Spectrum Colors, Inc.), each based on the weight of the base microfiber web, as described in U.S. Pat. No. 4,933,299, which is incorporated herein by reference.

The lineal weight of each boom was measured. The oil sorbency, tensile strength and stiffness were determined. The results are set forth in Table 1.

TABLE 1

| Ex. No. | Height (cm) | Width (cm) | Lineal Weight (g/m) | Oil Sorbency (g/g) | Tensile Strength (N/boom) | Stiffness (cm bend length) |
|---|---|---|---|---|---|---|
| 1 | 1.3 | 21 | 90 | 13.4 | 108 | 9.8 |
| 2 | 2.0 | 22 | 167 | 10.0 | 147 | 13.7 |
| 3 | 2.9 | 22 | 286 | 9.4 | 255 | 19.8 |
| 4 | 1.7 | 17 | 80 | 13.6 | 78 | 7.7 |
| 5 | 2.3 | 17 | 156 | 11.3 | 118 | 10.0 |
| 6 | 3.5 | 17 | 324 | 10.1 | 245 | 18.7 |
| 7 | 2.7 | 11 | 80 | 14.4 | 49 | 10.4 |
| 8 | 5.0 | 10 | 93 | 24 | 39 | 11.4 |

As can be seen from the data in Table 1, Examples 1-3 which contain only meltblown microfibers and 4-6 which contain meltblown microfiber base webs and microfiber microwebs demonstrate that as the lineal weight increases, the sorbency decreases while the tensile increases. Example 8 also demonstrates the effect of adding staple fiber content to significantly increase sorbency. In comparing Examples 1-3 with Examples 4-6, it can be seen that the addition of the microfiber microwebs to the base web increases boom flexibility.

EXAMPLES 9-12

In Examples 9-12, booms were prepared using equipment similar to that shown in FIG. 1 and various melt blown microfiber base webs, 15 denier polyester staple fiber (Eastman Type 431) and microfiber microwebs prepared as in Examples 4-8. The description of microfiber base web components and the amounts of each component are set forth in Table 2. The extrusion rate per unit length of die was 0.18 kg/hr/cm and the distance from the die to the collector was 0.46 m. The transverse collection speeds were 3.2, 2.6, 2.6 and 3.2 m/min for Examples 9-12 respectively.

The lineal weight was determined for each boom. Each boom was tested for oil sorbency and stiffness as in Examples 1-8. The tensile strength of each boom was determined as in Examples 1-8 except the jaw spacing was 12.7 cm in Examples 9 and 11 and 5.1 cm in Examples 10 and 12. The results are set forth in Table 3.

TABLE 2

| Ex. No. | Microfiber Base Web Component | Microfiber Base Content (%) | Staple Fiber Content (%) | Microfiber Microweb Content (%) |
|---|---|---|---|---|
| 9 | CELANEX 2002-2[1] | 46.1 | 10.8 | 43.1 |
| 10 | KRATON G1657X[2] | 37.8 | 12.2 | 49.0 |
| 11 | 25% FINA 3860[3]/ 75% KRATON G1657X | 39.9 | 12.0 | 48.1 |
| 12 | MORTON PS440-220[4] | 46.2 | 10.8 | 43.0 |

[1]Polybutylene terephthalate available from Hoechst Celanese Corp.
[2]Polystyrene-polybutadiene-polystyrene block copolymer available from Shell Corp.
[3]Polypropylene available from Fina Oil and Chemical Company.
[4]Polyurethane available from Morton International.

TABLE 3

| Ex. No. | Height (cm) | Width (cm) | Lineal Weight (g/m) | Oil Sorbency (g/g) | Tensile Strength (N/boom) | Stiffness (cm bend length) |
|---|---|---|---|---|---|---|
| 9 | 3.5 | 9 | 78.4 | 25.5 | 98 | 4.2 |
| 10 | 3.5 | 14 | 93.1 | 10.9 | 29 | 7.6 |
| 11 | 2.8 | 17 | 90.6 | 19.6 | 59 | 6.3 |
| 12 | 2.2 | 14.5 | 78.1 | 17.3 | 206 | 7.8 |

As can be seen from the data in Table 3, various classes of materials can be extruded for the base microfiber to form a self supporting boom with high sorbency and a range of tensile strength.

EXAMPLE 13

A source web was prepared of polypropylene (FINA Grade 70 MF) microfibers having an effective fiber diameter of 8 microns. The web had a basis weight of 410 g/m$^2$ and a solidity of 6.3%. The web was chopped using a Model #20 hammer mill (available from C.S. Bell Company) to form sorbent particles. The sorbent particles were blended with polyester staple fiber (Eastman Type 431) at a ratio of sorbent particles to staple fiber of 80 to 20 weight percent. This blend was then fed into a polypropylene (FINA Grade 70 MF) melt blown microfiber web having an effective fiber diameter of 8 microns using the same method for feeding in the polyester staple fiber as in Examples 1-8, except the blend was fed into the microfiber stream only at the center 75% of the die and the extrusion rate was 0.42 kg/hr/cm. Surfactant (10.3 weight percent TRITON X-100) and 0.5 weight percent gray pigment (#1607-052-15M Gray, available from Spectrum Colors) based on the weight of the microfiber base web were added at the die as disclosed in U.S. Pat. No. 4,933,299. The product was collected using a transverse collection speed of 25.8 m/min and a collection distance of 0.33 m on the input side and 0.41 m on the output side. The resultant boom had a lineal weight of 68 g/m and contained 42.9 weight percent microfiber base web, 11.4 weight percent staple fiber and 45.7 weight percent sorbent microweb particles. The boom was layered with the outer portions being substantially all microfiber structure and the center portion being a microfiber/staple fiber/microweb blend.

The boom produced had a sorbency in light mineral oil of 24.3 g/g, a tensile strength of 85N/boom and a bend length of 10.3 cm.

EXAMPLE 14

A source web was prepared of polypropylene (FINA Grade 70 MF) microfibers having an effective fiber diameter of 8 microns. The web had a basis weight of 410 g/m$^2$ and a solidity of 6.3%. The web was divellicated using a lickerin having 6.2 teeth/cm$^2$ at a speed of 2650 rpm to form sorbent microweb particles. Sorbent microweb particles were fed into a base microfiber web formed of two microfiber materials. Materials of the base web were generated by two separate dies, the outputs from which were made to converge before the inclusion of microweb particles and collection. The streams from the two dies intersected at an angle of approximately 60 degrees. The material produced from one die was a highly crystalline, oriented polypropylene. The degree of crystalline orientation was achieved by attenuating the fiber in an air chamber place directly in front of the microfiber die as taught in Meyer et al (4,988,560). The second microfiber stream was composed of polybutylene. The combined base microfiber web was 50% PP (Fina 70 MF) and 50% PB (Shell 8510). The product was collected using a transverse collection speed of 0.77 m/min with a collection distance of 0.25 m on the input side and 0.35 m on the output side. The resultant boom had a lineal weight of 197 g/m and contained 50 weight percent microfiber base web and 50 weight percent sorbent microweb particles.

The boom produced had a sorbency in light mineral oil of 11 g/g and had a tensile strength of 1112 N/boom.

EXAMPLE 15

Sorbent particulate microwebs were prepared as in Example 1. The microwebs and polyester staple fiber (Eastman Type 431) were fed into a microfiber base web using equipment similar to that shown in FIG. 1. The microfiber base web was formed from a coextruded blend of 48 weight percent polypropylene (FINA 70 MF) and 52 weight percent polyethylene (ASPUN 6806, available from Dow Chemical Company) at an extrusion rate of 0.98 kg/hr/cm and had an effective fiber diameter of 8 microns. The product was collected at a collector speed of 23 m/min and a distance of 0.33 m on the input side and 0.41 m on the output side. The boom contained 46.8 weight percent microfiber base web, 9.3 weight percent staple fiber and 43.9 weight percent microwebs and had a height of 5 cm and a width of 11 cm. The boom had a sorbency of 22.1 g/g, a lineal weight of 160 g/m, a tensile strength of 39 N/boom and a bend length of 6.9 cm.

EXAMPLE 16

Sorbent particulate microwebs were prepared as in Example 15. The microwebs and polyester staple fiber (Eastman Type 431) were fed into a microfiber base web using equipment similar to that shown in FIG. 1. The microfiber base web was formed from a coextruded blend of 48 weight percent polypropylene (FINA 70 MF) and 52 weight percent polybutylene (Type 8510, available from Shell Company) at an extrusion rate of 0.98 kg/hr/cm and had an effective fiber diameter of 8 microns. The product was collected at a collector speed of 30.3 m/min and a distance of 0.33 m on the input side and 0.41 m on the output side. The boom contained 46.8 weight percent microfiber base web, 9.3 weight percent staple fiber and 43.9 weight percent microwebs. The boom had a lineal weight of 122.7 g/m, a height of 4.2 cm and a width of 17 cm. The boom had a sorbency of 21.4 g/g, a tensile strength of 98 N/boom and a bend length of 26.6 cm.

EXAMPLE 17 AND COMPARATIVE EXAMPLE C1

In Example 17, a source web was prepared of 18.6 weight percent polypropylene (FINA Grade 70 MF) microfibers having an effective fiber diameter of 8 microns and 81.4 weight percent activated coconut carbon (Type RFM-C, available from Calgon Carbon Corp.). The web had a basis weight of 333 g/m² and a solidity of 21%. The web was divellicated using a lickerin having 6.2 teeth/cm² at a speed of 2650 rpm to form sorbent particles. The sorbent particles were blended with polyester staple fiber (Eastman Type 431) and fed into a polypropylene (FINA 70 MF) base web at the center 50% of the die using equipment similar to that shown in FIG. 1 and collected on the transverse collector. The base web fibers had an effective fiber diameter of 8 microns. Surfactant and pigment were added as in Example 13. The extrusion rate was 0.42 kg/hr/cm die width, the collector speed was 40.3 m/min and the collector was 0.33 m at the input side of the collector and 0.41 m at the output side of the collector from the die. The boom formed had a lineal weight of 36 g/m and contained 51.4 weight percent microfiber base web, 10.3 weight percent staple fiber and 38.3 weight percent sorbent particulate carbon-loaded microwebs. The boom had a tensile strength of 45 N/boom.

In Comparative Example C1, a boom was prepared as in Example 17 except the microwebs contained no carbon. The composition of the boom was 42.6 weight percent microfiber base web, 4.1 weight percent polyester staple fiber and 53.3 weight percent microweb sorbent particulate.

Each prepared boom was tested for carbon tetrachloride ($CCl_4$) vapor sorption. The total amount for a given time is set forth in Table 4.

TABLE 4

| | Total $CCl_4$ Vapor Sorption (g/g) | |
|---|---|---|
| Time (min) | Example 17 | Comparative Example 1 |
| 0 | 0.35 | 0.34 |
| 1 | 0.24 | 0.25 |
| 2 | 0.20 | 0.19 |
| 3.5 | 0.17 | 0.15 |
| 5 | 0.16 | 0.12 |
| 7.5 | 0.15 | 0.09 |
| 10 | 0.14 | 0.07 |
| 15 | 0.13 | 0.05 |
| 20 | 0.13 | 0.05 |
| 25 | 0.12 | 0.04 |
| 30 | 0.12 | 0.04 |
| 40 | 0.11 | 0.03 |
| 50 | 0.11 | 0.03 |
| 60 | 0.10 | 0.03 |
| 90 | 0.09 | 0.02 |
| 120 | 0.08 | 0.02 |
| 180 | 0.07 | 0.02 |
| 270 | 0.06 | 0.01 |
| 20 hrs | 0.04 | 0.01 | can be seen from the data in Table 4, the boom containing the activated carbon in the microweb particulate retained a greater amount of carbon tetrachloride for a longer period of time than did the boom containing no carbon.

EXAMPLE 18 AND COMPARATIVE EXAMPLE C2

In Example 18, a source web was prepared containing 20 weight percent polypropylene (FINA Grade 70 MF) microfibers having an effective fiber diameter of 8 microns and 80 weight percent sodium bicarbonate powder (Grade No. 1, available from Church & Dwight Co., Inc). The web had a basis weight of 910 g/m² and a solidity of 4.5%. The web was divellicated using a lickerin having 6.2 teeth/cm² at a speed of 2650 rpm to form sorbent particles. The sorbent particles were blended with polyester staple fiber (Eastman Type 431) and fed into a polypropylene (FINA 70 MF) base web at the center 50% of the die using equipment similar to that shown in FIG. 1 and collected on the transverse collector. The base web had an effective fiber diameter of 8 microns. Surfactant and pigment were added as in Example 13. The extrusion rate was 0.42 kg/hr/cm die width, the collector speed was 17.8 m/min and the collector was 0.33 m at the input side of the collector and 0.41 m at the output side of the collector from the die. The boom formed had a lineal weight of 92.5 g/m and contained 45.9 weight percent microfiber base web, 9.2 weight percent staple fiber and 44.9 weight percent sorbent particulate sodium bicarbonate-loaded microwebs. The boom had a tensile strength of 85 N/boom.

In Comparative Example C2, a boom was prepared as in Example 18 except the microwebs contained no sodium bicarbonate. The composition of the boom was 42.6 weight percent microfiber base web, 4.1 weight percent polyester staple fiber and 53.3 weight percent microweb sorbent particulate. The tensile strength of the boom was 77 N/boom.

Each prepared boom was tested for sorption of hydrochloric acid. The boom of Example 18 had meq base/g of 3.41 and the boom of Comparative Example C2 had meq base/g of 0.13.

EXAMPLE 19

A source web was prepared of polypropylene (FINA Grade 70 MF) microfibers having an effective fiber diameter of 8 microns. The web had a basis weight of 410 g/m$^2$ and a solidity of 6.3%. Synthetic super sorbent particulate (39.5 weight percent J-550, available from Grain Processing Corp.) was loaded onto the source web. The web was divellicated using a lickerin having 6.2 teeth/cm$^2$ at a speed of 2650 rpm to form sorbent microweb particles. The sorbent microweb particles and the synthetic super sorbent particles were blended with polyester staple fiber (Eastman Type 431). This blend was then fed into a polypropylene (FINA Grade 70 MF) melt blown microfiber base web having an effective fiber diameter of 8 microns at the center 50% of the die. Surfactant and pigment were used as in Example 13. The extrusion rate was 0.42 kg/hr/cm. The product was collected using a transverse collection speed of 36.9 m/min with and collection distance of 0.33 m on the input side and 0.41 m on the output side. The resultant boom had a lineal weight of 70.5 g/m and contained 29.1 weight percent microfiber base web, 5.8 weight percent staple fiber, 25.6 weight percent sorbent microweb particles and 39.5 weight percent super sorbent particles. The boom produced had a sorbency in water of 76 g/g and a tensile strength of 53 N/boom.

EXAMPLE 20 AND COMPARATIVE EXAMPLES C3–C6

For Example 20, a source web was prepared of polypropylene (FINA Grade 70 MF) microfibers having an effective fiber diameter of 8 microns. The web had a basis weight of 410 g/m$^2$ and a solidity of 6.3%. The web was divellicated using a lickerin having 6.2 teeth/cm$^2$ at a speed of 2650 rpm to form sorbent microweb particles. The sorbent microweb particles were blended with polyester staple fiber (Eastman Type 431) at a ratio of sorbent particles to staple fiber of 87.8 to 12.2 weight percent. This blend was then fed into a polypropylene (FINA Grade 70 MF) melt blown microfiber web having an effective fiber diameter of 8 microns using the same method for feeding in the polyester staple fiber as in Examples 1–8, except the blend was fed into the microfiber stream only at the center 75% of the die and the extrusion rate was 0.42 kg/hr/cm. Surfactant (10.3 weight percent TRITON X-100) and 0.5 weight percent gray pigment (#1607-052-15M Gray, available from Spectrum Colors) based on the weight of the microfiber base web were added at the die as disclosed in U.S. Pat. No. 4,933,299. The product was collected using a transverse collection speed of 20 m/min and with collection distance of 0.33 m on the input side and 0.41 m on the output side with the edges being trimmed. The resultant boom had a lineal weight of 79 g/m, a height of 3.8 cm, a width of 7.6 cm and contained 46.9 weight percent microfiber base web, 6.5 weight percent staple fiber and 46.6 weight percent sorbent microweb particles. The boom was layered with the outer portions being substantially all microfiber structure and the center portion being a microfiber/staple fiber/microweb blend.

The boom produced had a sorbency in light mineral oil of 21.2 g/g, a sorbency in water of 24.3 g/g, a tensile strength of 69 N/boom, and a bend length of 9.6 cm.

For Comparative Example 3, a microfiber web containing 10% staple fiber was chopped and placed in a tubular sleeve which was then closed at each end.

For Comparative Examples 4–6, tubular sleeves filled with ground corn cobs and closed at each end to form booms were used.

The lineal weight of each boom was determined and the booms were tested for sorbency in light mineral oil and for fluid recovery. The results are set forth in Table 5.

TABLE 5

| Example | Lineal Weight | Sorbency (g/g) | Recovery (%) |
|---|---|---|---|
| 20 | 79 | 21.2 | 87.1 |
| C3 | 344 | 9.0 | 0 |
| C4 | 180 | 6.9 | 0 |
| C5 | 430 | 3.3 | 0 |
| C6 | 374 | 4.9 | 0 |

As can be seen from the data in Table 5, the boom of Example 20 had superior sorbency over the comparative booms. Excellent recovery was achieved with the boom of Example 20. No recovery was achieved with the comparative booms because in each case the sorbent material shifted to the end of the tubular sleeve causing the sleeve to tear and allowing spillage of the sorbent material.

EXAMPLES 21 and 22

In Examples 21 and 22, beams were prepared as in Examples 1–8 with an extrusion rate of 0.42 kg/hr/cm. In Example 21, the collector was 0.3 m from the die and in Example 22 the collector was 0.38 m from the die. Each boom contained 45 weight percent melt blown microfiber base web, 46 weight percent microfiber microwebs and 9 weight percent polyester staple fiber. The lineal weight, sorbency ratio, tensile strength and height were determined and are reported in Table 6.

TABLE 6

| Ex. | Lineal Weight (g/g) | Sorbency Ratio (g/g) | Tensile Strength (N/boom) | Height (cm) |
|---|---|---|---|---|
| 21 | 87 | 23.8 | 76 | 5.0 |
| 22 | 75 | 30.0 | 73 | 4.7 |

As can be seen from the data in Table 6, the greater distance of the collector from the die in Example 22 over that in Example 21, increased lineal weight and sorbency ratio and decreased tensile strength and height.

Various modifications and alterations of this invention will be apparent to those skilled in the art without departing from the scope and spirit of this invention and this invention should not be restricted to that set forth herein for illustrative purposes.

What is claimed is:

1. A microfibrous sorbent article comprising an elongate boom having a substantially oval cross-section, said boom being formed of multiple adjacent microfibers layers, said layers being bonded to each other by entanglement of fibers between adjacent layers.

2. The article of claim 1 wherein said microfibers are polyolefin, polyester, polyamide, polyurethane, polystyrene-polybutadiene-polystyrene block copolymers, polyvinyl chloride, acrylic, acrylic copolymers, polystyrene or polysulphone.

3. The article of claim 1 further comprising sorbent particulate material.

4. The article of claim 3 wherein said sorbent particulate material is microfiber microwebs, wood pulp fibers, modified starches, diatomaceous earth, high-molecular weight acrylic polymers containing hydrophilic groups, alkylstyrene particles, activated carbon, or combinations thereof.

5. The article of claim 3 wherein said sorbent particulate material is present in an amount of about 0 to 90 weight percent.

6. The article of claim 3 wherein said sorbent particulate is present in the central 20 to 90 percent of the boom.

7. The article of claim 1 further containing neutralizing sorbent particulate material.

8. The article of claim 7 wherein said neutralizing sorbent particulate material is sodium bicarbonate, calcium hydroxide, borax, potassium dihydrogen phosphate, disodium hydrogen phosphate, potassium hydrogen phthalate or a combination thereof.

9. The article of claim 7 wherein said neutralizing sorbent particulate material is present in an amount of about 0 to 90 weight percent.

10. The article of claim 7 wherein said neutralizing sorbent particulate is present in the central 20 to 90 percent of the boom.

11. The article of claim 1 further comprising vapor suppression particulate material.

12. The article of claim 11 wherein said vapor suppression particulate material is activated carbon, alumina, sodium bicarbonate, silver, clay, hopcalite or a combination thereof.

13. The article of claim 11 wherein said vapor suppression particulate material is present in an amount of about 0 to 90 weight percent.

14. The article of claim 11 wherein said vapor suppression particulate material is present in the central 20 to 90 percent of the boom.

15. The article of claim 1 further comprising crimped bulking fibers.

16. The article of claim 15 wherein said crimped bulking fibers have about 1 to 10 crimps/cm.

17. The article of claim 15 wherein the size of the crimped bulking fibers is about 3 to 40 decitex.

18. The article of claim 15 wherein the length of the crimped bulking fibers is about 2 to 15 cm.

19. The article of claim 15 wherein said purifying sorbent particulate is present in the central 20 to 90 percent of the boom.

20. The article of claim 1 wherein said boom has a diameter of about 50 mm to 30.

21. The article of claim 1 wherein said boom has a lineal weight of about 20 to 600 g/m.

22. The article of claim 1 wherein said boom has an oil sorbency of at least about 5 g/g.

23. The article of claim 1 wherein the microfibers are oriented.

24. A method of making a microfibrous sorbent elongate boom-shaped article comprising
 a) extruding molten thermoplastic fiber-forming polymer from multiple orifices in a fiber-forming die, said orifices being aligned along the face of the die;
 b) attenuating the fibers in a stream of hot air;
 c) collecting said fibers on a conveyor surface substantially parallel to said die face and moving transverse to said die face to form the microfibrous sorbent article.

25. The method of claim 24 wherein said collector surface is angled no more than about 60° from the die.

26. The method of claim 24 wherein sorbent particulate is combined with said microfibers.

27. The method of claim 26 wherein said sorbent particulate is combined with said microfibers across only 20 to 90 percent of the die.

28. The method of claim 24 wherein neutralizing sorbent particulate is combined with said microfibers.

29. The method of claim 28 wherein said neutralizing sorbent particulate is combined with said microfibers across only 20 to 90 percent of the die.

30. The method of claim 24 wherein purifying particulate is combined with said microfibers.

31. The method of claim 30 wherein said purifying particulate is combined with said microfibers across only 20 to 90 percent of the die.

32. The method of claim 24 wherein bulking staple fibers are combined with said microfibers.

33. The method of claim 32 wherein said bulking staple fibers are combined with said microfibers across only 20 to 90 percent of the die.

34. The method of claim 24 further comprising the steps of orienting the fibers prior to collection.

35. The method of claim 24 further comprising the step of trimming the edges of the sorbent article.

* * * * *

UNITED STATES PATENT AND TRADEMARK OFFICE
CERTIFICATE OF CORRECTION

PATENT NO. : 5,360,654
DATED : November 1, 1994
INVENTOR(S) : Philip A. Anderson, Ronald R. Gorke, Thomas I. Insley, Daniel E. Meyer and David A. Olson It is certified that error appears in the above-indentified patent and that said Letters Patent is hereby corrected as shown below:

Col. 10, line 60   "6%" should read -- 6.3% --

Col. 18, line 13   "30." should read -- 30 cm. --

Signed and Sealed this

Twenty-eight Day of March, 1995

Attest:

BRUCE LEHMAN

Attesting Officer    Commissioner of Patents and Trademarks